(12) United States Patent
Rose

(10) Patent No.: US 10,486,353 B2
(45) Date of Patent: Nov. 26, 2019

(54) ENVIRONMENTALLY FRIENDLY DRY CLEANING BAGS AND METHODS OF MAKING SAME

(71) Applicant: Yonit Rose, Woodmere, NY (US)

(72) Inventor: Yonit Rose, Woodmere, NY (US)

(*) Notice: Subject to any disclaimer, the term of this patent is extended or adjusted under 35 U.S.C. 154(b) by 248 days.

(21) Appl. No.: 15/646,929

(22) Filed: Jul. 11, 2017

(65) Prior Publication Data

US 2018/0009148 A1 Jan. 11, 2018

Related U.S. Application Data

(60) Provisional application No. 62/360,488, filed on Jul. 11, 2016.

(51) Int. Cl.

| | | |
|---|---|---|
| *B29C 47/00* | (2006.01) | |
| *B29C 48/00* | (2019.01) | |
| *B29C 48/10* | (2019.01) | |
| *B29C 48/25* | (2019.01) | |
| *B29K 105/12* | (2006.01) | |
| *B29K 511/00* | (2006.01) | |
| *B29L 31/00* | (2006.01) | |

(52) U.S. Cl.
CPC ...... *B29C 48/0018* (2019.02); *B29C 48/0022* (2019.02); *B29C 48/022* (2019.02); *B29C 48/10* (2019.02); *B29C 48/25* (2019.02); *B29K 2105/12* (2013.01); *B29K 2511/00* (2013.01); *B29K 2995/006* (2013.01); *B29L 2031/7129* (2013.01)

(58) Field of Classification Search
None
See application file for complete search history.

(56) References Cited

U.S. PATENT DOCUMENTS

| 5,090,559 | A | 2/1992 | Gendreau | |
|---|---|---|---|---|
| 6,013,222 | A * | 1/2000 | Douglas | B24D 11/001 |
| | | | | 264/514 |
| 6,960,374 | B1 | 11/2005 | Terada et al. | |
| 8,235,206 | B2 | 8/2012 | Siegel et al. | |
| 8,240,465 | B2 | 8/2012 | Bennett | |

* cited by examiner

*Primary Examiner* — Monica A Huson
(74) *Attorney, Agent, or Firm* — Carter, Deluca & Farrell LLP; George Likourezos, Esq.

(57) ABSTRACT

A method of manufacturing a biodegradable dry cleaning bag is disclosed, the method including loading an environmentally friendly slurry into a hopper, extruding the environmentally friendly slurry, passing the environmentally friendly slurry through a die, inflating the environmentally friendly slurry into a cylindrical shape, thereby creating a cylindrical member, passing the cylindrical member over a first roller, and rolling the cylindrical member onto a roll.

18 Claims, 4 Drawing Sheets

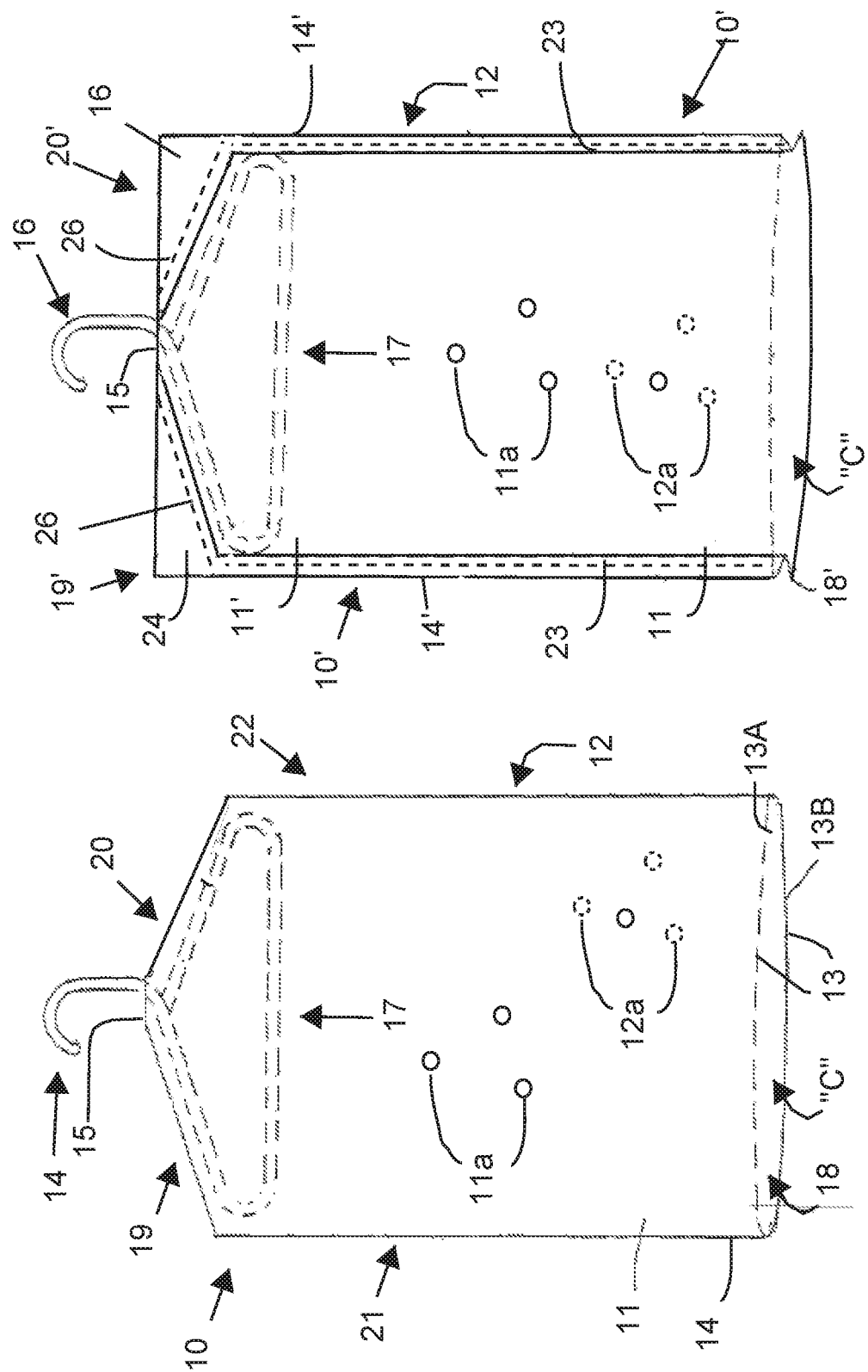

ENVIRONMENTALLY FRIENDLY DRY CLEANING BAGS AND METHODS OF MAKING SAME

CROSS-REFERENCE TO RELATED APPLICATION

The present application claims the benefit of U.S. Provisional Patent Application No. 62/360,488, entitled "ENVIRONMENTALLY FRIENDLY DRY CLEANING BAGS," filed Jul. 11, 2016, the entire contents of which are incorporated by reference herein.

BACKGROUND

Technical Field

The present disclosure is directed generally to environmentally friendly bags. More specifically, the application relates to biodegradable environmentally friendly bags used to protect garments, and methods of making same.

Description of Related Art

When it comes to protecting clothing, and particularly garments, from coming into contact with undesirable substances (e.g., dirt, water, etc.) during transportation or storage, clear plastic films are often used to enclose garments. These plastic films may be partially transparent and may further be used in a wide variety of applications, such as packaging or storage, of which typical examples are bags dry cleaning.

Current plastic covers or bags permit an individual to protect the appearance of a garment by fitting over or surrounding at least a portion of the garment. These plastic bags may be cumbersome due to their construction and often are not easily recycled upon disposal. Specifically, existing plastic covers are often manufactured with non-recyclable materials such as polyethylene and other plastics.

Many professional dry cleaners provide light weight plastic bags as a cover to protect freshly dry cleaned or laundered garments. The light weight plastic bags help keep the clean clothes isolated during transportation. These bags may present suffocation hazards, cause yellowing while in prolonged contact with garments, or otherwise stain or weaken the garment fibers. The yellowing and other changes in color is often caused by the presence of butylated hydroxyl tolune (BHT), an anti-oxidant used in the manufacturing of the plastic bag. When BHT comes in contact with moisture and air impurities, the BHT may cause a yellow pigment to be deposited onto the fabric. Further, the plastic bag may trap moisture against the garment and, if left in place for extended periods of time, may lead to the growth of mold or mildew.

Dry cleaning bag users tend to discard dry cleaning bags once their garments are transported. Dry cleaning bags are not biodegradable and difficult to recycle since they are often made with low-density polyethylene (LDPE). This particular type of thin, clear plastic is often referred to as "film" in the recycling industry. However, these materials are not uniformly accepted as recyclable material, and as such, often are disposed of in the trash. Likewise, many consumers prefer not to recycle due to inconvenience, again leading to the disposal of the bags in the trash. Thus, there is a desire for disclosures related to dry cleaning bags which are biodegradable.

SUMMARY

According to one aspect, the present disclosure relates to a method of manufacturing a biodegradable dry cleaning bag. The method includes loading an environmentally friendly slurry into a hopper, extruding the environmentally friendly slurry, passing the environmentally friendly slurry through a die, inflating the environmentally friendly slurry into a cylindrical shape, thereby creating a cylindrical member, passing the cylindrical member over a first roller, and rolling the cylindrical member onto a roll.

According to aspects, the method includes loading an environmentally friendly slurry including organic fibers.

In certain aspects, the method includes loading an environmentally friendly slurry including fibers derived from materials selected from the group consisting of trees, non-wood plants, cellulose based plants, wood, bagasse, miscanthus, wheat, grass, switchgrass, bamboo, eucalyptus, alfalfa, corn, barley, and combinations thereof.

In some aspects, the method further includes processing fibers to remove lignin polymers.

In aspects, the method further includes passing the cylindrical member over a second roller.

According to aspects, passing the cylindrical member over the second roller includes the second roller having at least one protrusion which defines a predetermined pattern.

According to certain aspects, passing the cylindrical over the second roller further includes the predetermined pattern forming a transverse line across the cylindrical member.

In certain aspects, the transverse line forms a perforated line.

In aspects, the predetermined pattern forms a plurality of transverse lines across the cylindrical member, defining a plurality of dry cleaning bags.

In aspects, the method further includes passing the plurality of dry cleaning bags over a third roller, the third roller including a second pattern.

In some aspects, passing the plurality of dry cleaning bags over the third roller includes forming a first and second shoulder on each of the dry cleaning bags.

BRIEF DESCRIPTION OF THE DRAWINGS

The accompanying drawings, which are incorporated in and constitute a part of the specification, illustrate embodiments of the disclosure and, together with a general description of the disclosure given above, and the detailed description of the embodiment(s) given below, serve to explain the principles of the disclosure.

FIG. 1 is a plan view of a dry cleaning bag in accordance with the present disclosure;

FIG. 2 is a plan view of an alternate embodiment of the dry cleaning bag of FIG. 1;

DETAILED DESCRIPTION

Figure 3:
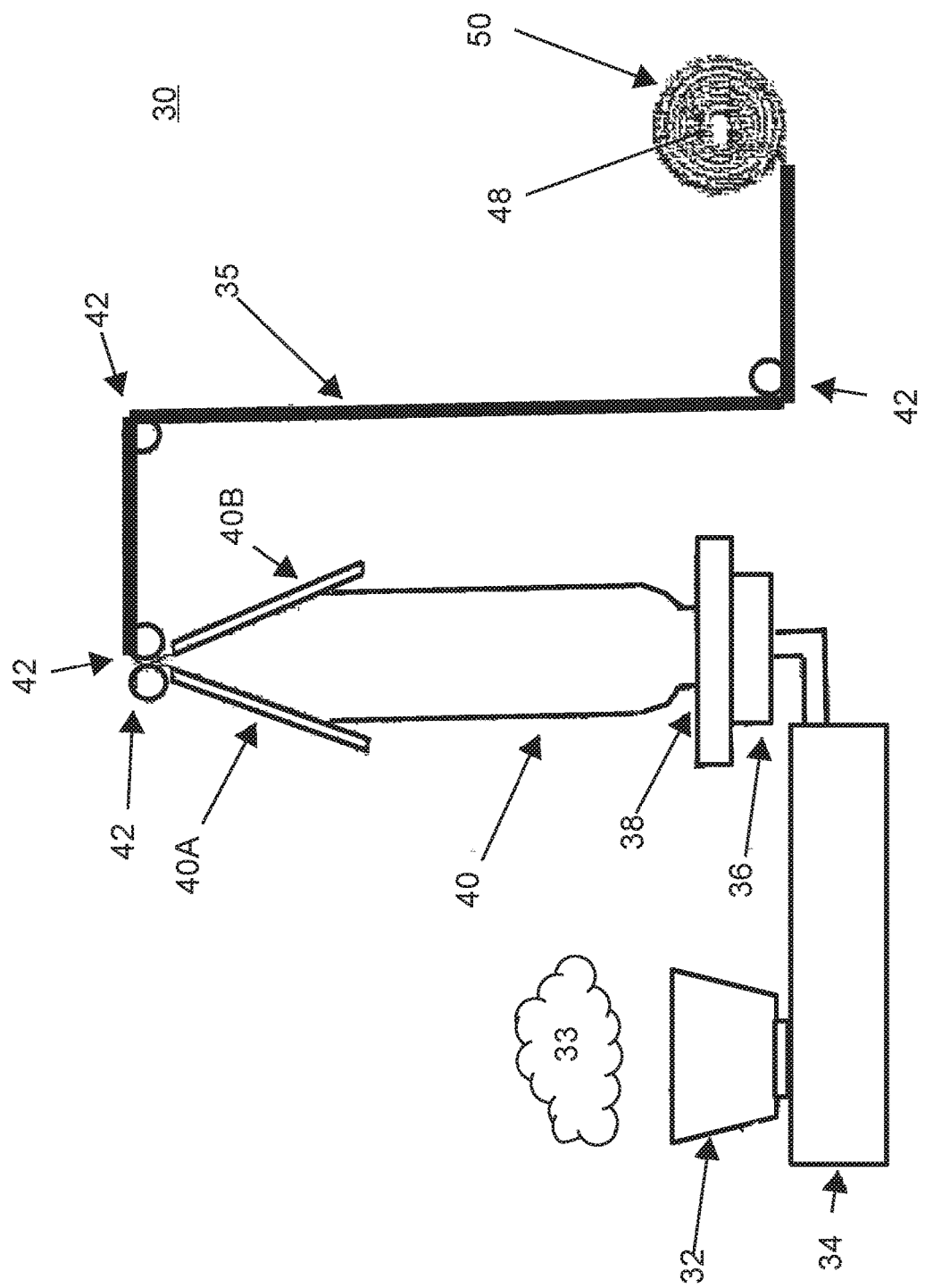
FIG. 3 is a system diagram of an apparatus for constructing the dry cleaning bag of FIGS. 1 and 2.

Embodiments of the present disclosure are described in detail with reference to the drawings, in which like reference numerals designate identical or corresponding elements in each of the several views.

FIG. 1 illustrates a dry cleaning bag in a first position, designated generally 10. The dry cleaning bag 10 includes a shell having a front portion 11 and a back portion 12, the front and back portions 11, 12 further including inner and outer surfaces, respectively. The front portion 11 and the back portion 12 are coupled along seams 14. When coupled, the front and back portions 11, 12 partially enclose a cavity "C" therein.

The dry cleaning bag 10 further includes a first opening 15 located along an upper portion of the dry cleaning bag 10. The first opening 15 is dimensioned to receive a hook portion 16 of a hanger 17 therethrough. The dry cleaning bag 10 further includes a second opening 18 located along a lower portion of the dry cleaning bag 10. The second opening 18 defines a diameter which is greater than a diameter defined by the first opening 15. The second opening 18 is configured to receive garments (not shown) therein. Specifically, the dry cleaning bag 10 is configured to be placed over the hook portion 16 of a hanger 17, and advanced over garments (not shown) disposed on the hanger 17. The first opening 15 is in opposing relation to the second opening 18.

The dry cleaning bag 10 may include a plurality of perforations 11a, 12a disposed along the front surface 11 or back surface 12. The plurality of perforations 11a, 12a may be disposed along the front surface 11 or the back surface 12. The plurality of perforations 11a, 12a may further be disposed in patterned formations or randomly disposed along the front surface 11 and back surfaces 12. The plurality of perforations 11a, 12a may be placed selectively so as to prevent the risk of suffocation by individual or animals. Additionally, the perforations 11a, 12a may allow for improved air flow between the front portion 11 and the back portion 12, which may enhance biodegradability of the dry cleaning bag 10.

The lower portion of the dry cleaning bag 10 includes a fastener 13 configured to couple the front portion 11 and the back portion 12, thereby sealing the bottom portion of the dry cleaning bag 10. More specifically, the fastener 13 includes a first fastener 13a and second fastener 13b. The first fastener 13a and second fastener 13b selectively couple to one another thereby permitting selective closure of the second opening 18 of the lower portion of the dry cleaning bag 10. In alternative embodiments, the lower portion of the front surface 11 and the back portion 12, which define the second opening 18, may be coupled to each other sealing the second opening 18 during manufacturing.

The dry cleaning bag 10 defines a pair of shoulders 19, 20 which taper upward from a left side 21 and a right side 22 toward the first opening 15. The shoulders 19, 20 are configured to be in direct contact with a right and left portion of the hanger 17, respectively.

Referring now to FIG. 2, an alternative embodiment of a dry cleaning bag 10 is shown, and referred to generally as dry cleaning bag 10'. Similar to dry cleaning bag 10, dry cleaning bag 10' includes front portion 11 and a back portion 12. The seams 14' further define a crease or gusset 23 which extends toward the center of the dry cleaning bag 10'. The gusset 23 permits expansion of the dry cleaning bag 10' when varying garments (not shown) are located therein. Additionally, a pair of detachable portions 24, 25 extends upward from the shoulders 19, 20 of the dry cleaning bag 10'. The detachable portions 24, 25 are coupled to the shoulders 19', 20', respectively, at along seams 26. The seams 26 are perforated and configured to be detached when upward pressure is applied to the detachable portions 24, 25 and downward pressure is applied in an opposing direction to the dry cleaning bag 10', more particularly, when downward pressure is applied to the first and second portion 11, 12 of the dry cleaning bag 10'. The seams defined by the shoulders 19', 20' are positioned downward relative to the detachable portions 24, 25, respectively.

The dry cleaning bag 10' may be coupled to a plurality of dry cleaning bags 10' at the upper and lower portions of the dry cleaning bags 10'. When coupled, the dry cleaning bags 10' may be combined to form a roll 50 (FIG. 3). The roll 50 includes a plurality of bags 10 coupled via a plurality of perforated or cut lines (not shown). The cut lines are configured to transversally seal the lower portion of a bag 10' from roll 50.

FIG. 3 illustrates a system diagram of an apparatus for constructing the dry cleaning bags 10, 10' of the present disclosure, the system referred to generally as 30. The system includes a hopper 32, an extruder 34, a die 36, an air ring 38, a bubble container 40, and rollers 42. The hopper 32 is configured to receive an environmentally friendly slurry 33 (or slurry 33) which is described later in detail. Once processed, the environmentally friendly slurry 33 may be loaded into the hopper 32, which feeds the environmentally friendly slurry 33 into the extruder 34. The hopper 32 may be loaded with fresh slurry 33, made of newly processed fibers, or a slurry 33 of partially or completely recycled fibers or recycled slurry 33. The fibers used to form the environmentally friendly slurry 33 are preferably biodegradable, e.g., made from plant-based, polymeric-based (e.g., biodegradable plastics and/or polymers), or any combination of such materials thereof. In embodiments, it is contemplated that the environmentally friendly slurry 33 may be combined with non-biodegradable slurries or materials such as polyolefin or other thermoplastic fibers, or any combination thereof. Further, it is contemplated that the biodegradable slurry 33 may be combined with biodegradable plastics such as, without limitation, aliphatic polyesters. The slurry 33 may include an adhesive such as a water-based adhesive. When combined with the fibers of the slurry 33, the adhesive binds the fibers into a finished sheet of film.

The environmentally friendly slurry 33 is then fed into the extruder 34. The extruder 34 forms the environmentally friendly slurry 33 into a sheet or film 35. The film 35 is then passed from the extruder toward the die 36 which forms the film 35 into a tube shape. The die 36 may be an annular slit die, or any other suitable die capable of separating the film 35.

The film 35 is then fed into the air ring 38 which applies pressurized gas or air toward the film 35. As air is directed toward the film 35, the film 35 is pressed against the walls of the bubble container 40 while maintaining the tube shape. Further, as the film 35 passes through the air ring 38, the film 35 come into contact with heated air which dries any liquid, including any included adhesive, found in the environmentally friendly slurry 33, before passing the film 35 toward the bubble container 40. Drying film 35 prevents the film 35 from coupling or folding over before being received by the rollers 42.

Figure 3A:
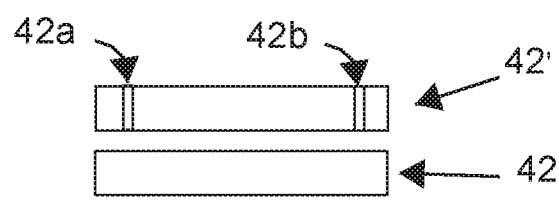
FIG. 3A is a top plan view of the pair of rollers coupled to the bubble container of FIG. 3.

As the film 35 is then passed through the bubble container 40, the film is advanced toward a pair of tapered surfaces 40a, 40b. As the film 35 contacts the pair of tapered surfaces 40a, 40b, respectively, the film 35 folds over to create a flat tube which is subsequently transferred to a pair of rollers 42. The pair of rollers 42 coupled to the bubble container 40, commonly referred to as nip rollers, (see FIG. 3A) may include a roller 42' which has a first and second flange 42a, 42b disposed along opposing portions of an exterior surface of the roller 42'. As a result of passing between rollers 42, 42', the left and right sides 21, 22 of the dry cleaning bags 10, or left and right sides 21', 22' of the dry cleaning bag 10', are formed.

Figure 3B:
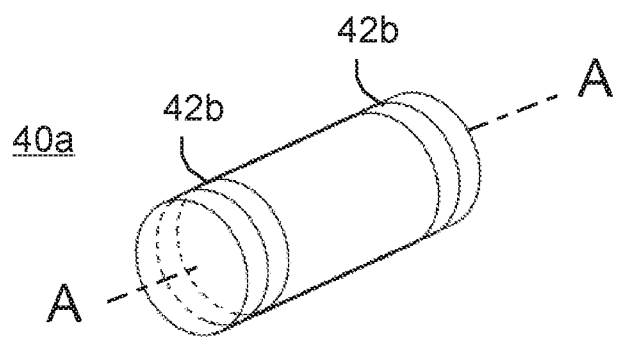
FIG. 3B is a perspective of a roller including a pair of opposing flanges disposed circumferentially about a roller in accordance with aspects of the present disclosure.
Figure 3C:
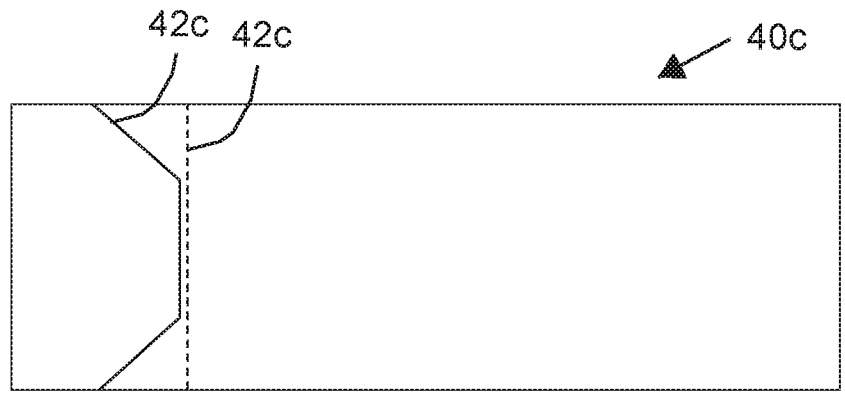
FIG. 3C is a diagram of a pattern disposed along a roller in accordance with aspects of the present disclosure.
Figure 3D:
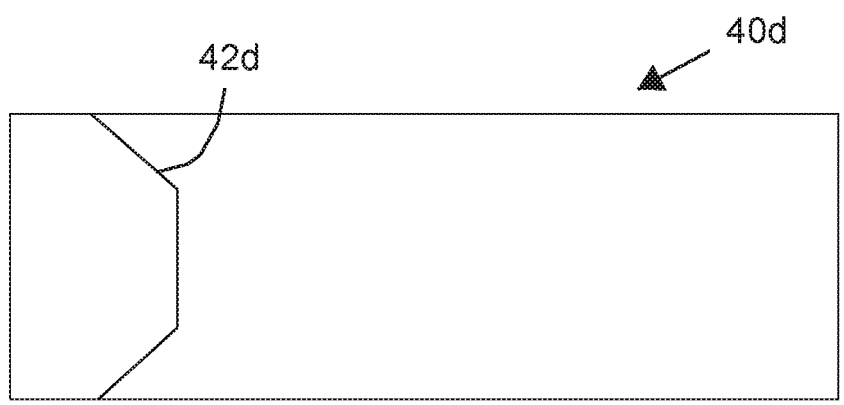
FIG. 3D is a an alternate diagram of a pattern disposed along a roller in accordance with aspects of the present disclosure.

The rollers 42 may be positioned relative to one another such that a gusset 23 may be formed (FIG. 2) along the sides of the extruded film 35 as the film is passed over the rollers 42. The film 35 is then passed along additional rollers 42 which allow the film 35 to cool prior to being rolled about a tube 48 to form a roll 50. Any of the rollers 42 may define varying diameters and may further include transverse flanges 42c (FIG. 3C). The transverse flanges 42c are disposed along the roller to form perforations between the dry cleaning bags 10, 10'. The transverse flanges 42c may be serrated or textured so as to perforate, cut, or otherwise act upon the film 35 as the film 35 passes over the rollers 42. The transverse perforations formed by the rollers 42 may be spaced at predetermined distances, thereby forming uniform dry cleaning bags 10, 10' prior to placing the dry cleaning bags 10, 10' onto the tube 48. Additionally, the transverse flanges 42c may be sharpened, or pointed, so as to cut the dry cleaning bags 10, 10', thereby eliminating the need to roll the dry cleaning bags 10, 10'. It is contemplated that the rollers may have varying predetermined patters applied such that the dry cleaning bags 10, 10' may take different forms (see FIG. 3B, illustrating varying roller patterns).

For a detailed discussion of the extrusion and formation of extruded plastic tubes, reference may be made to U.S. Pat. Nos. 3,157,720, and 7,556,762, the entire disclosures of which are hereby incorporated by reference.

In alternative embodiments, the slurry 33 may be strained through a screen made of fine mesh in order to create a fibrous web. The fibrous web of the slurry 33 may then be pressed and allowed to dry. Pressure may be applied to the fibrous web so as to remove any remaining liquid or water. Once the fibrous web is dehydrated, the fibrous web may be cut to form sheets (not shown). The fibrous web may be partially dehydrated, such that the fibrous web may further be acted upon or processed as desired, e.g., to add colors, increase or reduce transparency by treating the fibrous web with chemicals, etc. The sheets may then be coupled via a water-based adhesive or other such suitable material to allow the sheets to remain in fixed relation relative to one another. The sheets are then cut as necessary to form individual dry cleaning bags 10, 10'. The combined sheets may also be dimensioned such that the sheets extend to a length suitable to be cut to form multiple dry cleaning bags 10, 10'. The extended sheet may then be formed in a roll, and cut by the end user, as desired.

When used by end users or consumers, the roll 50 is placed on a dispenser (not shown). The end user may selectively remove bags, either by tearing one or more dry cleaning bags 10, 10' along perforated edges, or by cutting the bags apart with sharp utensils, such as scissors. Once the dry cleaning bag 10, 10' is separated from the roll, the dry cleaning bag 10, 10' may be placed over one or more hangers holding garments (FIGS. 1 and 2), so that the garments are covered.

Referring generally to slurry 33 which may be used to form any of the components described, the slurry 33 is formed by mixing liquid and fibers, which form a pulp. The fibers are plant based (e.g., from trees, non-wood plants, or cellulose-based plants) or tree based (e.g., wood fibers, etc.). Additionally, the fibers may be made of bagasse (sugar cane), miscanthus, wheat, grass, non-tree fibers, non-hardwood fibers, switchgrass, bamboo, eucalyptus, alfalfa, corn, barley, or combinations thereof. These fibers may be broken down mechanically (e.g., crushing, ripping, grinding, etc.) or chemically so as to separate out the fibers. The separated fibers are then mixed with a liquid to form the pulp. The environmentally friendly slurry 33 herein is a slurry capable of creating a biodegradable dry cleaning bag which is fabricated from, at least in part, biodegradable materials in accordance with the present disclosure.

Where fibers include lignin polymers, the lignin must be removed. If recycled materials are used to create the pulp, then removal of lignin polymers and other elements is not necessary. Once the lignin polymers are removed, the pulp may be treated with bleach so as to lighten the final film used to form the dry cleaning bags 10, 10'. The pulp is then further liquefied by diluting the pulp with water.

It will be understood that various modifications may be made to the embodiments of the presently disclosed devices, systems, and methods. Therefore, the above description should not be construed as limiting, but merely as exemplifications of embodiments. Those skilled in the art will envision other modifications within the scope and spirit of the present disclosure. Additionally, components or elements of each of the described devices, systems, and methods may be interchanged by one skilled in the art to form devices, systems, and methods which are consistent with the present disclosure.

What is claimed is:

1. A method of manufacturing a biodegradable dry cleaning bag, the method comprising:
    loading an environmentally friendly slurry into a hopper;
    extruding the environmentally friendly slurry;
    passing the environmentally friendly slurry through a die;
    inflating the environmentally friendly slurry into a cylindrical shape, thereby creating a cylindrical member;
    passing the cylindrical member over a first roller; and
    rolling the cylindrical member onto a roll,
    wherein the environmentally friendly slurry includes organic fibers.

2. A method of manufacturing a biodegradable dry cleaning bag, the method comprising:
    loading an environmentally friendly slurry into a hopper;
    extruding the environmentally friendly slurry;
    passing the environmentally friendly slurry through a die;
    inflating the environmentally friendly slurry into a cylindrical shape, thereby creating a cylindrical member;
    passing the cylindrical member over a first roller; and
    rolling the cylindrical member onto a roll,
    wherein the environmentally friendly slurry includes fibers derived from materials selected from the group consisting of trees, non-wood plants, cellulose based plants, wood, bagasse, miscanthus, wheat, grass, switchgrass, bamboo, eucalyptus, alfalfa, corn, barley, and combinations thereof.

3. The method of claim 2, further comprising processing fibers to remove lignin polymers.

4. The method according to claim 3, further comprising passing the cylindrical member over a second roller.

5. The method according to claim 4, wherein passing the cylindrical member over the second roller includes the second roller having at least one protrusion which defines a predetermined pattern.

6. The method according to claim 5, wherein passing the cylindrical member over the second roller further includes the predetermined pattern forming a transverse line across the cylindrical member.

7. The method according to claim 6, wherein the transverse line formed is a perforated line.

8. The method according to claim 7, wherein the predetermined pattern forms a plurality of transverse lines across the cylindrical member, defining a plurality of dry cleaning bags.

9. The method according to claim 8, further comprising passing the plurality of dry cleaning bags over a third roller, the third roller including a second pattern.

10. The method according to claim 9, wherein passing the plurality of dry cleaning bags over the third roller includes forming a first and second shoulder on each of the dry cleaning bags.

11. The method of claim 1, further comprising processing fibers to remove lignin polymers.

12. The method according to claim 11, further comprising passing the cylindrical member over a second roller.

13. The method according to claim 12, wherein passing the cylindrical member over the second roller includes the second roller having at least one protrusion which defines a predetermined pattern.

14. The method according to claim 13, wherein passing the cylindrical member over the second roller further includes the predetermined pattern forming a transverse line across the cylindrical member.

15. The method according to claim 14, wherein the transverse line formed is a perforated line.

16. The method according to claim 15, wherein the predetermined pattern forms a plurality of transverse lines across the cylindrical member, defining a plurality of dry cleaning bags.

17. The method according to claim 16, further comprising passing the plurality of dry cleaning bags over a third roller, the third roller including a second pattern.

18. The method according to claim 17, wherein passing the plurality of dry cleaning bags over the third roller includes forming a first and second shoulder on each of the dry cleaning bags.

* * * * *